3,484,402
STABLE HIGH MELT FLOW POLYPROPYLENE CONTAINING TRIAZINE COMPOUND AND FATTY ACID SALT

William O. Drake and Kenneth R. Mills, Bartlesville, Okla., assignors to Phillips Petroleum Company, a corporation of Delaware
No Drawing. Filed Oct. 18, 1966, Ser. No. 587,423
Int. Cl. C08f *3/08, 45/60*
U.S. Cl. 260—23       3 Claims

ABSTRACT OF THE DISCLOSURE

Polypropylene is modified by the addition of 4,6-di(4-hydroxy-3,5-di-tert-butylphenoxy) - 2 - octylthio-1,3,5-triazine and at least one monocarboxylic fatty acid salt of the metals of Groups I and II, said fatty acid salt having from 12 to 24 carbon atoms per molecule. The resulting composition has increased melt flow and yet exhibits improved long-term thermostability.

---

This invention relates to a new and improved method for modifying the properties of polypropylene. This invention also relates to a new and improved composition for modifying polypropylene properties.

General-purpose polypropylene is generally produced with a melt flow (ASTM D 1238–62T, Condition L) of 3.5 to 5. In melt spinning polypropylene into fibers, it is desirable to use a polymer having a melt flow in the range of 25 to 50. Thus, heretofore, widespread use of general-purpose polypropylene in melt spinning operations has not been possible except by subjecting the general-purpose polypropylene to expensive processes that decrease the molecular weight, i.e. increase the melt flow, of the polypropylene. Further, heretofore it has not been generally possible to increase the melt flow of polypropylene without to some degree damaging the long-term thermal stability of that polymer.

Quite surprisingly, it has now been found that a combination of two specific materials when added to polypropylene not only increases the melt flow to the desired extent to render the polypropylene suitable for melt spinning operations but also, and at the same time, actually improves the long-term thermal stability of the polymer.

By this invention it has been found that polypropylene is modified and improved in the above-described manner by adding thereto an effective amount of 4,6-di(4-hydroxy - 3,5 - di - tert - butylphenoxy)-2-octylthio-1,3,5-triazine (hereinafter referred to as triazine) with an effective amount of at least one saturated or unsaturated monocarboxylic fatty acid salt of the metals of Groups I and II having from 12 to 24, preferably 16 to 22, carbon atoms per molecule, inclusive. Preferred metals are Ca, Mg, Ba, Sr, and Be. Examples of fatty acid salts that can be used are sodium laurate, barium myristate, potassium palmitate, calcium stearate, sodium arachidate, zinc behenate, cadmium lignocerate, lithium oleate, magnesium cetoleate, strontium selacholeate, and the like, and mixtures thereof. Thus, the process of this invention involves incorporation of the above-mentioned compounds into polypropylene in such an intimate manner as to disperse these compounds into polypropylene thereby effecting the results of the invention.

The composition of this invention is a mixture of the two materials discussed hereinabove.

This invention also relates to polypropylene containing the above-mentioned composition of this invention.

The polypropylene of this invention is suitable for melt spinning or otherwise forming into fibers and the fibers formed from the polypropylene of this invention can be woven or knitted or tufted to form woven fabric such as draperies and the like as well as tufted articles such as carpeting, and the like.

Accordingly, it is an object of this invention to provide a new and improved method for modifying polypropylene. It is another object of this invention to provide a new and improved composition capable of modifying the properties of general-purpose polypropylene. It is another object of this invention to provide a polypropylene modified by the modifying composition of this invention. It is another object of this invention to provide a method for increasing the melt flow of general-purpose polypropylene and at the same time improve the long-term thermal stability of that polypropylene together wtih a composition for effecting such melt flow modification and thermal stability.

Other aspects, objects, and the several advantages of this invention will be apparent to those skilled in the art from the description and appended claims.

According to this invention any polypropylene can be employed, but generally polypropylene having a melt flow as determined by the above-mentioned ASTM procedure of 3½ to 5 is preferred.

The polypropylene useful in this invention can be obtained commercially or can be produced using any one of several conventional procedures well known in the art. The triazine and fatty acid salts of this invention can be mixed with the polypropylene separately or in combination as a separate mixture from the polypropylene in any conventional manner known in the art. A presently desired result of the mixing is that the triazine and fatty acid salt or salts are intimately dispersed in the polypropylene. Suitable mixing procedures include dry mixing the various components, making the triazine and/or fatty acid salts into one or more solutions thereof and blending the solutions with the polypropylene in liquid or solution form, melt blending the triazine and/or fatty acid salts separately or in combination with melted polypropylene at temperatures that are not substantially deleterious to the polypropylene, triazine, fatty acid salt nor to the results of the invention, and the like. A presently preferred procedure of mixing is to make the triazine and fatty acid salts up into solutions and blend the solutions with the polypropylene at room or an elevated temperature for a length of time to obtain an intimate mixture. A conventional Brabender Plastograph or other similar mechanical stirring device is suitable for use in this invention.

The triazine and/or fatty acid salt of this invention can be made up into a slurry using any solvent that is substantially inert to the solutes and polypropylene and is nondeleterious to the results of the invention. Suitable solvents include acetone, benzene, ethyl acetate, cyclohexane, methylcyclopentane, n-pentane, methyl alcohol, and the like.

The triazine and each fatty acid salt employed can be used in the polypropylene in widely varying amounts, the amounts being sufficient to be effective for obtaining the improved results of this invention of increased melt flow and improved thermal stability. Generally, the triazine and each fatty acid salt employed will be so employed in an amount of from about 0.01 to about 1, preferably from about 0.03 to about 0.5, weight percent based on the total weight of the polypropylene to be modified.

The modified composition of this invention comprises a mixture of the triazine and at least one of the fatty acid salts. The composition can be made by mixing these components in any conventional manner such as those disclosed hereinabove with respect to mixing the triazine, etc. with polypropylene and include dry blending, solution mixing wherein one or both or all of the components are in solution in a suitably inert solvent, and melt blending wherein one or more of these components is in the melted state but at a temperature below that at which substantial degradation of any one of the components occurs. Generally, the triazine and fatty acid salts can be readily mixed in solution using one or more of the solvents disclosed hereinabove with respect to mixing of these materials with polypropylene.

The modifying composition of this invention can exist separately from polypropylene and has utility in this separate existence as a modifying composition which, when added to polypropylene, increases the melt flow of that polypropylene and at the same time improves its long-term thermal stability.

The modifying composition of this invention when existing separately from the polypropylene consists essentially of from about 25 to about 75 weight percent triazine, the remainder being essentially one or more of the fatty acid salts of this invention.

The modified and stabilized polypropylene of this invention comprises polypropylene which incorporated therein, preferably intimately mixed therewith, the modifying composition of this invention. The polypropylene composition of this invention will contain the triazine and one or more fatty acid salts each in the amount disclosed hereinabove with respect to the incorporation of these materials into polypropylene.

The process of this invention, the stabilized polypropylene of this invention, and the modifying composition of this invention can each employ additional polypropylene additives so long as the improved results of this invention are unaffected. For example, additional conventional stabilizer against thermal, ultraviolet, and other degrading effects can be used as well as fillers, coloring pigment, foaming agents, and the like. Thioesters that can be used are: dilaurylthiodipropionate, laurylstearylthiodipropionate, hexyltetracosylthiodipropionate, octyltetradecylthiodiacetate, heptylheptadecylthiodiheptanoate, and 1-lauryl-8-stearyl diester of 4-thiaoctanedioic acid, and 1-hexyl-10-tetracosyl diester of 3-thiadecanedioic acid, and the like. Also, phosphite esters such as isobutylphosphite, tridecylphosphite, cyclohexylphosphite, phenylphosphite, tridecylphosphite, 1-naphthylphosphite, dioctylphosphite, cyclohexyldecylphenylphosphite, diphenylphosphite, didecylphosphite, and the like can be employed.

An inert carrier such as silica or diatomaceous earth can be employed which would serve as a bulking agent and dispersant aid for the triazine and fatty acid salt.

EXAMPLE

Polypropylene prepared with a hydrogen-modified diethylaluminum chloride $TiCl_3 \cdot \frac{1}{3} AlCl_3$ catalyst and having a melt flow of about 4 (ASTM D1238–62T, Condition L) was used in three different runs. In each run 0.1 weight percent calcium stearate and 0.1 weight percent dilaurylthiodipropionate, both based upon the total weight of the polypropylene, were incorporated into the polypropylene by mixing the two additives in acetone and then incorporating the acetone mixture with polypropylene powder. In the three runs 0.1 weight percent based upon the total weight of the polypropylene of three different antioxidants were incorporated, each antioxidant in a separate portion of polypropylene. Each antioxidant was mixed or dissolved in acetone and the acetone mixture was stirred into the polypropylene. The stirring of the mixtures into the polypropylene was effected mechanically and after evaporation of the acetone solvent with stirring, the polymer-additive mixtures were blended in a Brabender Plastograph for 10 minutes under a nitrogen atmosphere at 190 to 215° C. using a stirring speed of 60 r.p.m.

Each of the three polypropylene portions containing a different antioxidant was tested to determine the change in melt flow of the polypropylene and long-term thermal stability of the polypropylene.

The decrease in melt viscosity was determined by a plastograph stability procedure which involved additional working in a Brabender Plastograph in contact with air at 200 to 215° C. and 50 r.p.m. to determine the time required for a 500 meter-gram drop of torque. The results of the tests, termed plastograph stability, are reported as a percentage of the theoretical area under the torque vs. time curve if no degradation of the polypropylene took place. In other words, the plastograph stability, percent, is the area under the torque vs. time curve divided by that same area assuming no loss in torque, the result of this division being multiplied times 100.

Plastograph stability is an indication of change in melt flow and a low value for plastograph stability indicates the desired increase in melt flow for melt spinning.

Long-term thermal stability of the polypropylene was determined by molding each of the blended samples into a 20-mill sheet at 217° C. The sheet for each sample was then cut into five 0.25 x 1.75 inch strips and the five strips for each of the three samples was placed in 150° C. forced-draft air oven. The strips were visually inspected periodically and any crazing, spotting, or crumbling of the strips was classified as a failure for that strip. The strips were heated until all five strips for each of the three samples had failed, the time for failure for each strip being recorded. The long-term stability for each sample was then calculated by ignoring the first and last strips for each sample that failed and averaging the time for failure for the three remaining strips for each sample. The higher the time, the higher the oven stability and therefore the greater the indication of good long-term stability.

The results of these tests are as follows:

TABLE I

| Sample | Antioxidant | Plastograph stability, percent | Long-term stability, average time for failure for 2nd, 3rd, and 4th specimen to fail, day |
|---|---|---|---|
| 1 | 2,6-di-tert-butyl-4-methylphenol. | 24 | 2 |
| 2 | 1,1,3-tris(2-methyl-4-hydroxy-5-tert-butyl-phenyl)butane. | 75 | 10 |
| 3 (invention). | 4,6-di(4-hydroxy-3,5-di-tert-butylphenoxy)-2-octylthio-1,3,5-triazine. | 33 | 19 |

From the above data for Run 3 it can be seen that the combination of the triazine of this invention gave good long-term stability. The combination of properties of relatively high melt flow (relatively low plastograph stability) and high long-term stability is not obtained by using other more conventional antioxidants as can be seen from Runs 1 and 2.

ILLUSTRATIVE EMBODIMENT

Runs 1 through 3 of Example I are repeated using the same procedure of Example I except that no dilaurylthiodipropionate is present. The results obtained are similar to those shown in Table I.

ILLUSTRATIVE EMBODIMENT

Runs 1 through 3 of Example I are repeated using the same procedure of Example I except that 0.1 weight percent of dioctylphosphite are also employed in each run. The results obtained are similar to those shown in Table I.

ILLUSTRATIVE EMBODIMENT

A 1 weight percent solution of the triazine of this invention in acetone and a 1 weight percent mixture of calcium stearate in acetone are mixed together at room temperature to produce a single acetone mixture containing 1 weight percent of the triazine and 1 weight percent of the calcium stearate.

Thereafter, this combined mixture is heated with stirring to evaporate the acetone. After removal of the acetone, the residue remaining consists essentially of a 50/50 mixture of the triazine of this invention and calcium stearate.

This mixture of triazine and calcium stearate embodies the modifying composition of this invention and can be used as an additive to polypropylene to increase both the melt flow and long-term thermal stability of that polypropylene.

Reasonable variations and modifications are possible within the scope of this disclosure without departing from the spirit and scope thereof.

We claim:

1. A composition for increasing melt flow and thermal stability of polypropylene consisting essentially of from about 25 to about 75 weight percent based upon the total weight of the composition of 4,6-di(4-hydroxy-3,5-di-tert-butylphenoxy)-2-octylthio-1,3,5-triazine, the remainder being essentially at least one monocarboxylic fatty acid salt of the metals of Groups I and II, said at least one fatty acid salt having from 12 to 24 carbon atoms per molecule, inclusive.

2. The composition according to claim 1 wherein said fatty acid salt is calcium stearate.

3. Polypropylene containing the composition of claim 1 in an amount wherein the triazine and calcium stearate are each present in the polypropylene in an amount in the range of from about 0.01 to about 1 weight percent based upon the total weight of the polypropylene present.

References Cited

UNITED STATES PATENTS

| 2,985,617 | 5/1961 | Sayler | 260—23 |
| 3,193,521 | 7/1965 | Jasching | 260—45.85 |
| 3,255,191 | 6/1966 | Dexter | 260—45.8 |
| 3,335,108 | 8/1967 | Pines | 260—45.8 |
| 3,337,495 | 8/1967 | Corbett | 260—23 |

DONALD E. CZAJA, Primary Examiner

D. J. BARRACK, Assistant Examiner

U.S. Cl. X.R.

252—400; 260—41, 45.85, 45.8